Oct. 25, 1955    R. E. ROSS    2,721,414
ARTIFICIAL FISH LURE
Filed Feb. 16, 1955
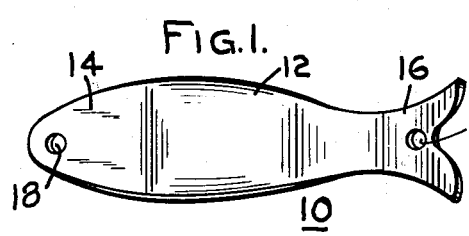
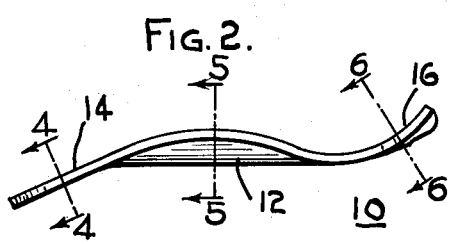
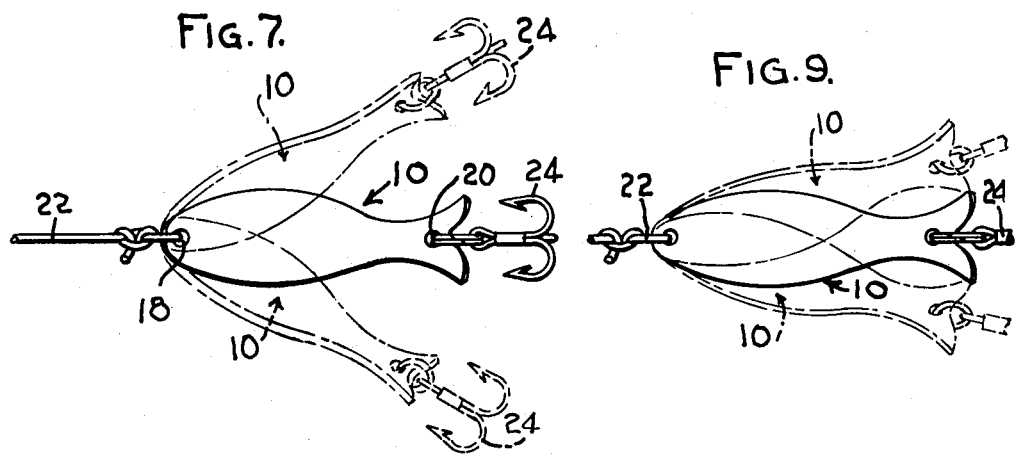
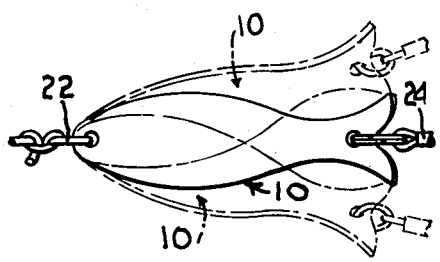
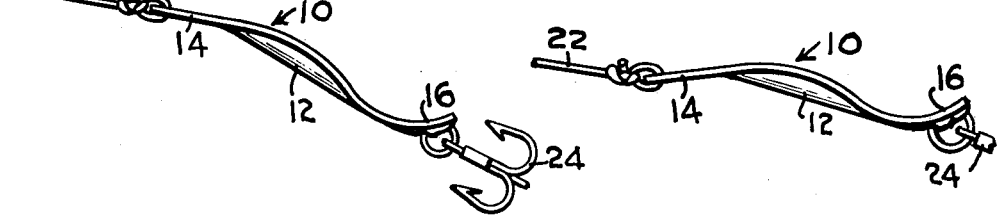
INVENTOR:
Robert E Ross.

United States Patent Office 2,721,414
Patented Oct. 25, 1955

2,721,414

ARTIFICIAL FISH LURE

Robert E. Ross, Lexington, Mass.

Application February 16, 1955, Serial No. 488,456

3 Claims. (Cl. 43—42.5)

This invention relates generally to artificial fish lures, and has particular reference to a lure formed of a single piece of sheet metal.

Many types of artificial lures formed of sheet metal have been developed and are in use, however they all have the disadvantage that they are not readily adapted to various conditions of fishing. It is thought that fish are attracted to such lures by reason of their appearance and motion through the water. It is also thought that different species of fish react to such lures at different speeds of travel of the lure through the water, and that fish of a particular species may react to different lure speeds and depths of travel under different fishing conditions, such as differences in the weather, water temperature, water clarity, and lure color.

For good casting, lures of this type should be formed of material thick enough to impart sufficient mass to the lure to minimize the effect of air resistance. Lures so formed generally have a satisfactory action in the water only at relatively fast speeds of retrieve, tending to lose their action at lower speeds. Such lures also tend to sink to an excessive depth at slow speeds, so as to drag the bottom in shallow water.

Lures of this type may be given unusual shapes, with erratic bends, to provide suitable action at slow speeds of retrieve. Such shapes generally cause the lure to spin or come out of the water at higher speeds, and they have the further disadvantage, from the manufacturing standpoint, that they are difficult to finish by plating and wheel buffing, which is the usual method of achieving a highly reflective surface.

Most lures of this type have the further disadvantage that the addition of a sinker to the line close to the lure for deeper fishing hampers the action of the lure by restricting the motion of the nose.

The object of the invention is to provide an artificial fish lure formed of sheet metal which is formed of relatively thick material to provide good casting, yet has a shape which gives the lure an action at slow speeds without excessive sinking and an action at higher speeds without spinning or coming out of the water.

A further object of the invention is to provide an artificial fish lure having a shape which imparts an action to the lure principally about the nose as a center so that the addition of a sinker to the line ahead of the lure does not hamper the action.

Other objects of the invention will, in part, be obvious, and will, in part, appear hereinafter.

In the drawing:

Fig. 1 is a top plan view of a fish lure embodying the features of the invention;

Fig. 2 is a view in side elevation of the lure of Fig. 1;

Fig. 3 is a view of the lure of Fig. 2 as seen from the left end;

Fig. 4 is a view in section taken on line 4—4 of Fig. 2;

Fig. 5 is a view in section taken on line 5—5 of Fig. 2;

Fig. 6 is a view in section taken on line 6—6 of Fig. 2;

Fig. 7 is a top plan view of the lure assembled with a hook and line, illustrating the action thereof at relatively slow speeds through the water;

Fig. 8 is a view in side elevation of the assembly of Fig. 7;

Fig. 9 is a view of the lure assembly similar to Fig. 7, illustrating the action of the lure at faster speeds through the water;

Fig. 10 is a view in side elevation of the assembly of Fig. 9.

Referring to the drawing, there is illustrated an artificial lure 10, which is formed of a single piece of material, preferably copper, zinc, or alloys thereof. The lure 10 comprises a medial portion 12 which may have a length of from about one third to one half of the total length of the lure, a forward portion 14 which may have a length of about one fourth to one third of the total length of the lure, and a rear portion 16 which may have a length of about one fourth to about one third of the total length of the lure. Apertures 18 and 20 may be provided at the front and rear ends to secure a line 22 and a hook 24 in the usual manner.

In the illustrated embodiment, the lure has a generally fish-like outline, however this particular outline is not essential, but certain proportions thereof are desirable as will appear hereinafter.

As illustrated in Figs. 1–6, the medial portion 12 is substantially straight longitudinally and is transversely rounded, so that the side edges thereof are inclined upwardly, the forward portion 14 is transversely and longitudinally flat and is inclined downwardly at a slight angle to the medial portion, and the rear portion is inclined upwardly from the medial portion and is transversely rounded so that the side edges thereof are inclined upwardly.

The lure is substantially symmetrical about the longitudinal center line, and in the preferred embodiment the forward portion has an area greater than the rear portion, and the medial portion decreases in width from the front to the rear thereof. These preferred proportions enhance the action of the lure in the water and have the further advantage that when the lure is in the air during a cast, the wind resistance of the lure is greatest at the nose, so that the lure travels tail first, with the hook as far from the line as possible. Hence it is almost impossible for the hook to foul the line.

The shape of the lure gives it a steady swimming wiggle action when traveling through the water, with the lure swinging from side to side in an arc, with the center of motion being approximately at the nose. As illustrated in Figs. 7 and 8, at slow speeds of travel through the water, the tail of the lure swings from side to side in an arc, with the angle between the longitudinal axis of the lure body and the horizontal being illustrated in Fig. 8. At higher speeds through the water, as illustrated in Fig. 9, the lure swings from side to side in a similar arc, but the angle of swing is less, and as illustrated in Fig. 10, the angle of the lure in relation to the horizontal is also less.

The lure is, therefore, self-adjusting to its speed through the water over a wide range of speeds, since increased speed merely decreases the degree of swing of the lure and decreases its angle in relation to the horizontal. The decreased angle results in decreased lift due to the decreased angle of the medial portion to the flow of water therepast, and due to the fact that at such decreased angle, the nose portion 14 is inclined slightly downwardly, thereby preventing the lure from coming out of the water. However at slower speeds, the greater angle of the lure to the horizontal provides increased lift, to keep the lure from sinking to an excessive depth.

An important advantage of the lure is the fact that since the shape of the lure tends to lift it in the water at slow speeds, the lure may be made of relatively thick material for good casting. Another advantage of the lure is the fact that the action results from the swinging of the rear portion generally about the nose, with substantially no sideways motion of the front portion. Hence the addition of a sinker to the line directly ahead of the lure for deeper fishing does not hamper the action. The configuration of the lure permits it to be easily finished by buffing and plating.

Since certain obvious changes may be made in the lure without departing from the scope of the invention, it is intended that all matter contained herein be interpreted in an illustrative and not in a limiting sense.

I claim:

1. A fish lure formed of a single piece of sheet material and comprising an elongated body substantially symmetrical about the longitudinal center line, the medial one third to one half portion of said body having upwardly inclined side edges, the forward one quarter to one third portion of said body being transversely and longitudinally flat, the rear one third to one quarter portion of said body being inclined upwardly from said medial portion and having upwardly inclined side edges.

2. A fish lure as set forth in claim 1 in which the forward portion of the body is inclined downwardly from the medial portion and has an area substantially greater than the rear portion.

3. A fish lure as set forth in claim 2 in which the medial portion is longitudinally flat and decreases in width from the front to the rear.

References Cited in the file of this patent

UNITED STATES PATENTS

| | | |
|---|---|---|
| 1,326,821 | Ackerman | Dec. 30, 1919 |
| 1,803,056 | Davis | Apr. 28, 1931 |
| 1,862,917 | Anderson | June 14, 1932 |
| 1,871,377 | Khoenle | Aug. 9, 1932 |
| 2,463,889 | Lundemo | Mar. 8, 1949 |
| 2,570,474 | Novitzky | Oct. 9, 1951 |